US009046198B2

(12) United States Patent
Mongiorgi et al.

(10) Patent No.: US 9,046,198 B2
(45) Date of Patent: Jun. 2, 2015

(54) MULTIFUNCTIONAL COMB TO SECURE METALLIC PIPING AND METHOD FOR SECURING SUCH PIPING

(75) Inventors: Patrick Mongiorgi, Saint Nazaire (FR); Stephane Pauchet, Guerande (FR); Maud Didnee, Saint Nazaire (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 55 days.

(21) Appl. No.: 13/605,831

(22) Filed: Sep. 6, 2012

(65) Prior Publication Data
US 2013/0056591 A1 Mar. 7, 2013

(30) Foreign Application Priority Data

Sep. 6, 2011 (FR) ..................................... 11 57881

(51) Int. Cl.
| | |
|---|---|
| *F16L 3/08* | (2006.01) |
| *F16L 3/12* | (2006.01) |
| *F16L 3/223* | (2006.01) |
| *F16L 55/035* | (2006.01) |

(52) U.S. Cl.
CPC .......... *F16L 3/2235* (2013.01); *Y10T 29/49826* (2015.01); *F16L 3/223* (2013.01); *F16L 3/08* (2013.01); *F16L 55/035* (2013.01)

(58) Field of Classification Search
CPC ................. F16L 3/00; F16L 3/08; F16L 3/22; F16L 3/223; F16L 3/2235; F16L 55/035
USPC ............. 248/68.1, 67.5, 74.1, 74.4, 632, 634; 174/135, 136, 154, 155, 156, 157, 174/68.1, 35
See application file for complete search history.

(56) References Cited

U.S. PATENT DOCUMENTS

| | | | | |
|---|---|---|---|---|
| 2,288,158 | A | | 6/1942 | Ellinwood |
| 2,354,919 | A | * | 8/1944 | Lockwood .................. 248/68.1 |
| 2,362,124 | A | | 11/1944 | Ellinwood |
| 3,682,422 | A | * | 8/1972 | Evans .......................... 248/68.1 |
| 5,992,802 | A | * | 11/1999 | Campbell .................... 248/68.1 |
| 5,996,945 | A | * | 12/1999 | Coles et al. .................. 248/68.1 |
| 6,783,101 | B2 | * | 8/2004 | Knotts .......................... 248/68.1 |
| 8,294,030 | B2 | * | 10/2012 | Pollard, Jr. .................... 174/155 |
| 2006/0249636 | A1 | * | 11/2006 | Thiedig et al. .............. 248/74.4 |

OTHER PUBLICATIONS

French Search Report dated Apr. 17, 2012.

* cited by examiner

*Primary Examiner* — Tan Le
(74) *Attorney, Agent, or Firm* — Dickinson Wright PLLC

(57) ABSTRACT

A multifunctional comb includes an upper half-comb provided to be mounted on a support and a lower half-comb provided to be mounted on the support through the upper half-comb and a screw system. The half-combs have arches facing each other to grip the piping. In addition, each of the half-combs has at least two half-bores located in front of each other to form bores of the comb, as well as inter-arches connecting faces. The half-bores, the arches and the connecting faces are continuously covered by an electrically conductive coating in order to ensure the plating function. Moreover, the half-bores, the upper half-comb and the bottom half-comb include structure coupled to the half-combs that can be secured to the support respectively in a temporary and permanent way.

9 Claims, 5 Drawing Sheets

US 9,046,198 B2

MULTIFUNCTIONAL COMB TO SECURE METALLIC PIPING AND METHOD FOR SECURING SUCH PIPING

TECHNICAL FIELD

The invention relates to a multifunctional comb to secure a metallic piping consisted of several parallel pipes. The invention concerns a method to secure such a metallic piping.

The invention applies in particular, but not exclusively, to aircrafts in which metal pipes, used to transport fluids, extend parallel to each other—generally along a ceiling or a superior wall—in portions of hold or in double partitions.

Such pipes are maintained at intervals by combs which enclose them and which are secured to supports. For electrical safety reasons, these metal pipes are connected by metal collars to a ground.

STATE OF THE ART

Hitherto, two operations concerning the pipings are independently realized: the support of these pipings by combs and the metallizing of collars. FIG. 1 illustrates an example of a set of piping consisted of three parallel pipes T1 to T3 secured to the ceiling of an aircraft technical space.

The pipes T1 to T3 are maintained in place by a comb P consisted of two half-combs P1 and P2 which enclose the pipes and are fixed by screw-and-nut systems S1 and S2 on a support C.

Besides, the metallization of these metal pipes is provided by clamping collars C1 to C3 mounted to the pipes T1 to T3 and connected together by metal cords C10 and C11. A last cord C12 connects the pipe T1 to the support C and thus to the metal wall which serves as ground.

This solution is not satisfactory in terms of handling an important number of parts (screws, nuts, collars, cords, etc.) and in terms of time to realize both operations. For example, during the fastening operation, it is at first necessary to temporary fasten the half-comb P1 to the support by means of double clips K1 and K2 as shown in FIG. 2. The clips are mounted in two central bores A1 and A2 of the half-comb P1. These clips are introduced into openings formed beforehand in the support. Then, the whole of both half-combs P1 and P2 is secured by means of the screw-and-nut systems by introducing screws in the outermost bores A3 and A4.

STATEMENT OF THE INVENTION

The invention aims at freeing itself from these drawbacks by a preliminary integration of the temporary and permanent fastening means in the half-combs in combination with conductive coatings to allow to provide electrical continuity for the metallization.

More exactly, the object of the present invention is to provide a multifunctional comb intended to secure metallic piping consisted of several parallel pipes, this comb consisting of two half-combs, an upper half-comb provided to be mounted on a support and a lower half-comb provided to be mounted on the support through the upper half-comb. The half-combs present arches facing each other provided to enclose the pipes. More particularly, the half-combs present each at least two half-bores located in, front each other to form bores of the comb, as well as inter-arches connecting faces of the half-bores, the arches and connecting faces are continuously covered by an electrically conductive coating. Moreover, the half-bores of the upper and lower half-combs include means integral with the half-combs and capable to be secured to said support respectively in a temporary and permanent way.

Under these conditions, all the elements to provide the fastening and metallization functions of the comb are integrated into the comb and thus are directly accessible and functional, without risk of loss or lengthening of the installation times.

According to advantageous features:

the temporary fastening means are selected between at least two pins, a peg clip provided in every said half-bores and a clip;

the permanent fastening means are composed of screws provided with blocking means into the bores;

a metal insert, in particular in the form of mesh or hoop, can be integrated into a neutral plan of the upper half-comb to achieve a higher electrical conductivity.

The invention also relates to an assembly method for a metallic piping, consisted of parallel pipes successively spaced out, on a support secured in the piping environment. According to the steps of this method:

a first upper half-comb is secured to the support with the aid of temporary fastening means and comes to partially enclose pipes;

a second half-comb also comes to enclose the pipes so that the half-combs form a comb with the extension of the structure of the half-combs and a continuity of the electrical conductivity by contact;

permanent fastening means, beforehand integrated into the second half-comb, come to make the comb integral with the support by crossing the first half-comb then to accommodate inside the support and bring about a tight linkage of the half-combs on this support as well as a continuous electrical conductivity of the assembly between the pipes and the support through the comb.

According to particular embodiments:

the upper half-comb includes in a median plan an electrical conductive thin film to increase the electrical conductivity of the assembly;

the temporary fastening means are selected among clipsage, pegging and compression means.

DESCRIPTION OF THE DRAWINGS

Others data, characteristics and advantages of the present invention will become apparent after a reading of the following non-limiting description, with reference to the appended drawings which represent, respectively.

DETAILED DESCRIPTION

Figure 1:
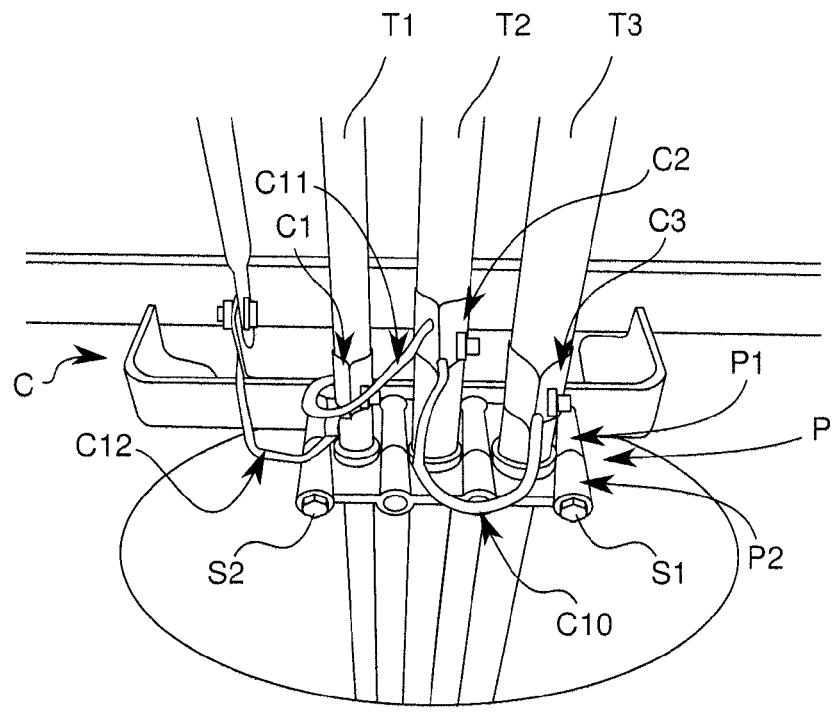
FIG. 1 shows a typical example of a set of piping (already mentioned)
Figure 2:
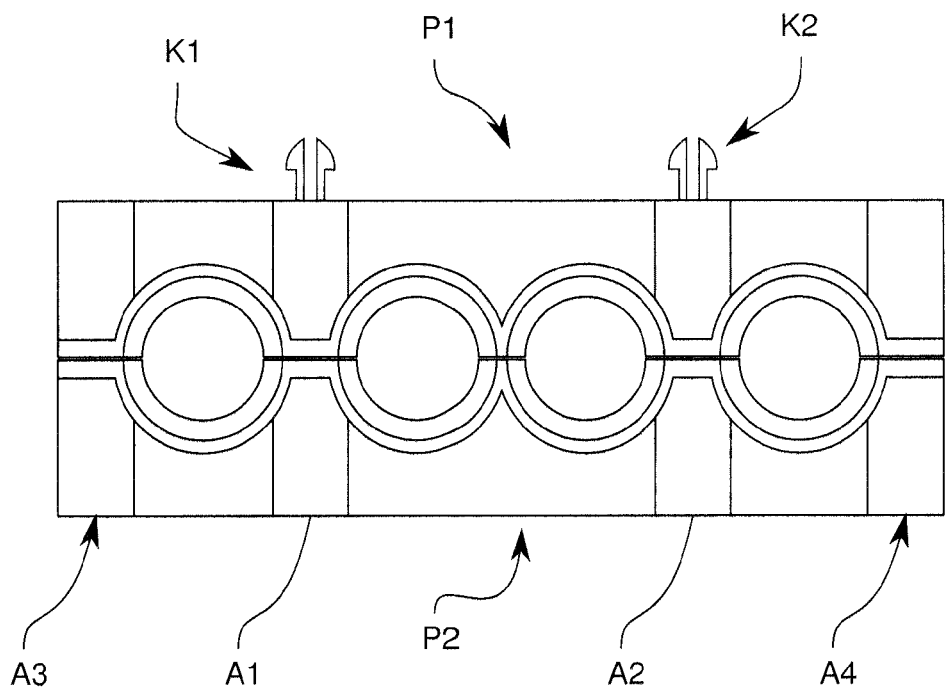
FIG. 2 show half-combs according to the state of the art (already mentioned)

The terms "lower" and "upper" as well as their derivates relate to the relative positions of the concerned parts in their final assembly to the ceiling according to FIG. 1. By extension, the upper and lower half-combs so identified can be used in others fastening configurations of pipes not necessarily along a ceiling or equivalent.

Figure 3A:
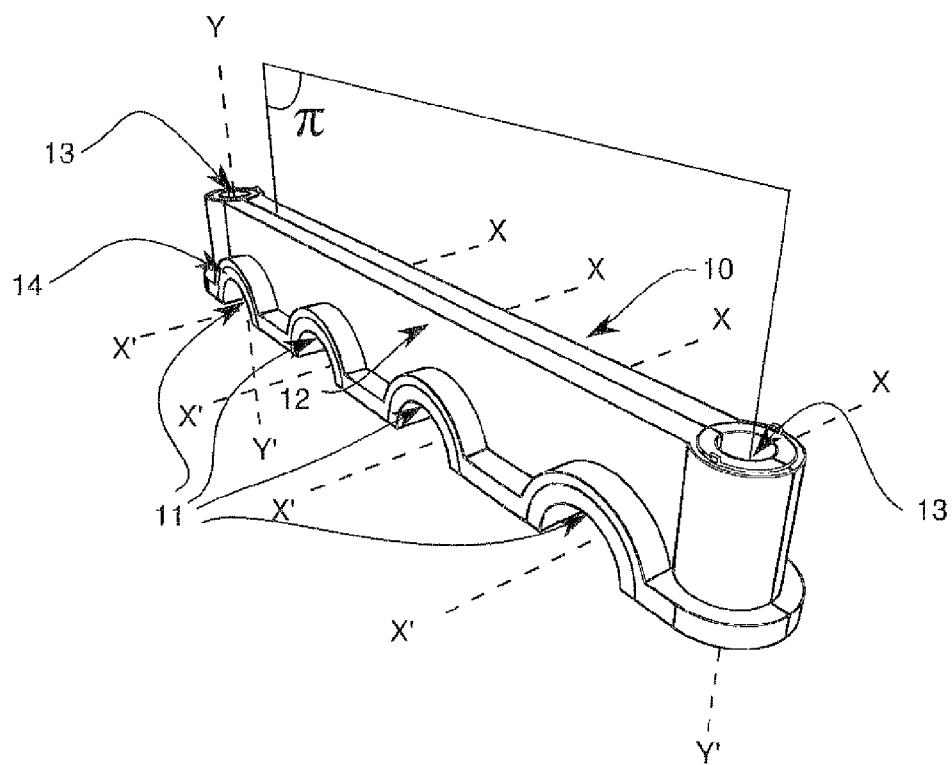
FIGS. 3a to 3c show perspective views (FIGS. 3a and 3b) of an example of a first half-comb named upper half-comb according to the invention as well as a partially enlarged view (FIG. 3c) highlighting the pins.
Figure 3B:
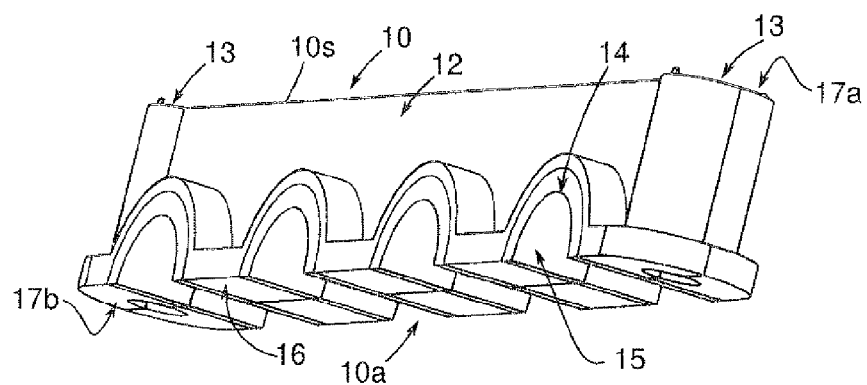

With reference to the perspective views of FIGS. 3a and 3b, a first half-comb 10, named upper half-comb, is illustrated. The half-comb 10 includes four arches 11, with central axes X'X transversely extending at the median plan π of the half-comb. The half-comb 10 further includes a main wall 12 extending along this median plan and two half-bores 13 arranged at the ends of the wall 12. These bores extend along axes Y'Y perpendicular to axes X'X.

The arches 11 are covered with a silicone layer 14 on which an electrically conductive coating is laid, in this example a metal layer 15, more exactly an aluminum layer. Other metals can be used, in particular aluminium- and/or copper-based alloys. This aluminum layer 15 also recovers the flat connecting inter-arches portions 16, as well as the half-bores 13 and the sides 17a and 17b at the ends of these half-bores 13. So the aluminum layer 15 continuously covers all the lower face 10a of the upper half-comb 10, which face support arches 11, while extending in the half-bores 13 and up to the sides 17a of said upper face 10s, opposite to the face 10a. Such an aluminum layer can be manufactured for example from an adhesive tape of aluminium or by moulding an injected metal powder.

Figure 3C:
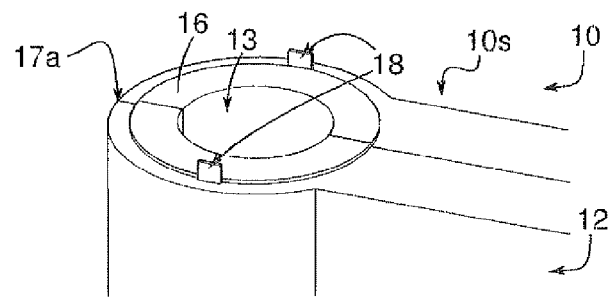

Furthermore, as shown on the partially enlarged view of FIG. 3c, two pins 18 which face each other are molded in the border of each side 17a of the upper face 10s of the half-comb. These pins are intended to provide a temporary holding of the half-comb 10 in a support C (see FIG. 1) provided with openings in which pins are accommodated.

Figure 4A:
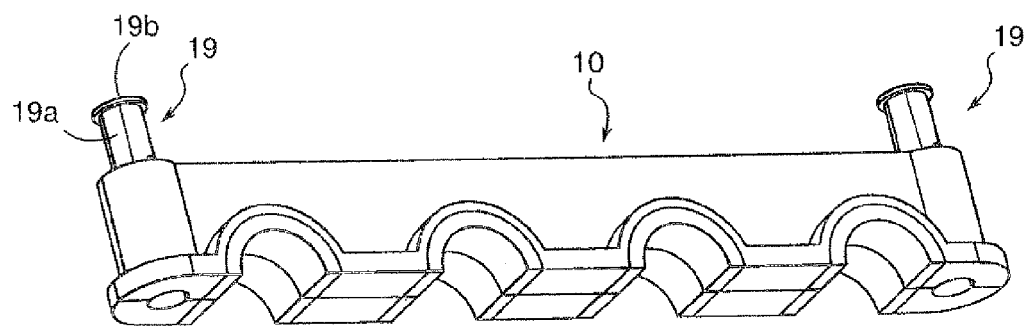
FIGS. 4a and 4b show a perspective view (FIG. 4a) and an exploded perspective view (FIG. 4b) of an alternative embodiment of the upper half-comb with peg clip.
Figure 4B:
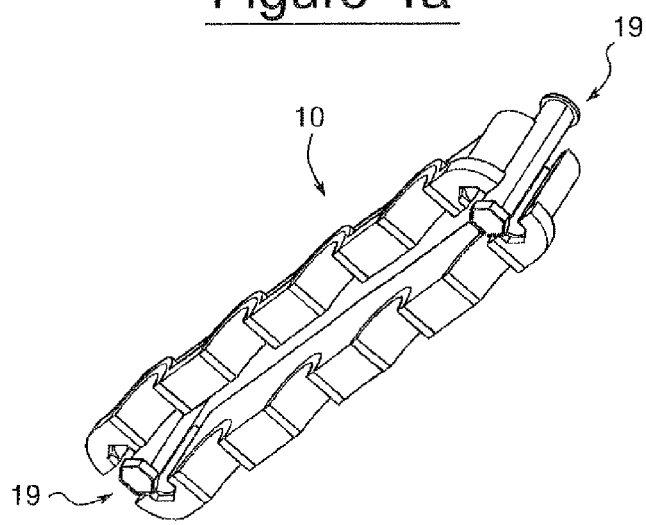

According to an alternative illustrated in FIGS. 4a and 4b, the pins are replaced by peg clips 19. Each peg clip 19 includes blades 19a which exert a holding pressure in the half-bore 13 which accommodates the peg. The head 19b which protrudes from each half-bore 13 is clipsed in an appropriate opening provided in the support.

Figure 5A:
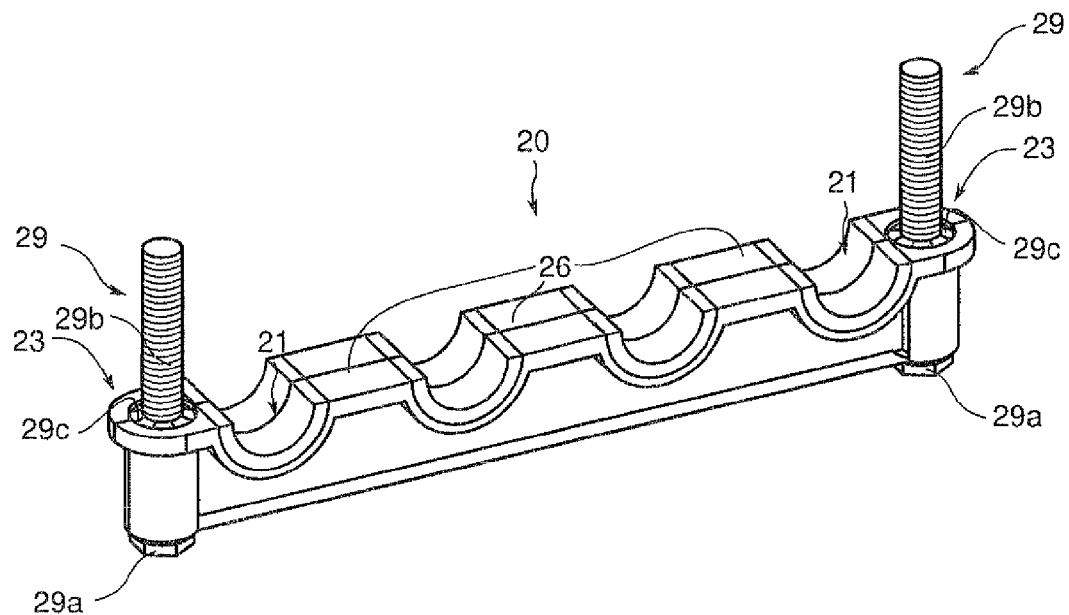
FIGS. 5a to 5c show a perspective view (5a), an exploded perspective view (FIG. 5b) and a partially cut-away view in assembly with the upper half-comb (FIG. 5c), of an example of a second half-comb named lower half-comb with a retaining washer according to the invention.
Figure 5B:
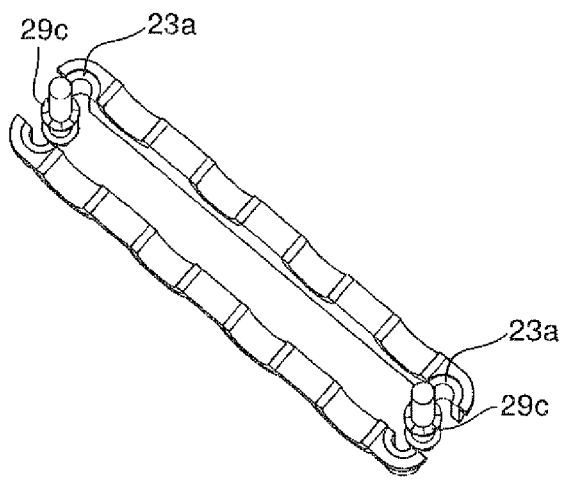

In reference to FIGS. 5a and 5b, an example of said lower comb 20 is illustrated. This lower half-comb 20 is identical to the upper half-comb 10 with regard to a plane of symmetry lying on the flat connecting inter-arches portions 26 provided between the arches 21. Unlike the upper half-comb 10, the half-bores 23 of the lower half-comb 20 are not covered by a metal layer. Indeed, such a covering is not necessary to assure the electrical continuity because the metallization is assured through the half-bores of the upper half-comb 10.

The half-bores 23 thus directly accommodate permanent fastening screws 29 formed with an external screwing head 29a, a threaded rod 29b and a captive retaining washer 29c constituting blocking means in the bores. This washer is first arranged on the rod 29b, in a smooth region where the threading of the screw is interrupted. The washer 29c is then accommodated in the half-bores 23 of the lower half-comb 20, near the inter-arches connecting face 26. More exactly, in the example, the washer 29c is accommodated in a groove 23a formed in each half-bore 23.

The head 29a remains outside the comb on the lower half-comb side 20 and the rod 29c is a long enough threaded rod to cross the bores of the comb and permanently settle to the support C.

Figure 5C:
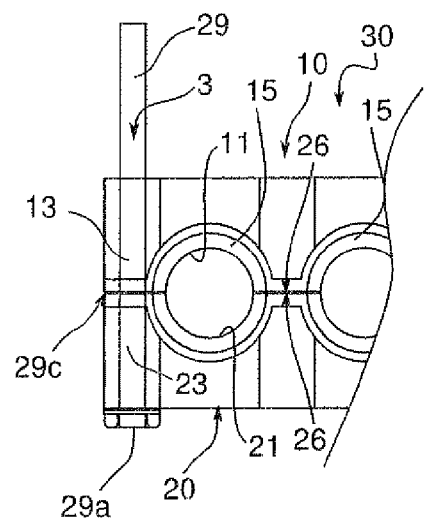

The lower half-comb 20 is provided with the half-comb 10 mounted according to the partially cut-away view of the FIG. 5c. The half-bores 13 of the upper half-comb 10 are freely mounted on the permanent fastening screws 29 on the opposite to the half-bores 23 of the lower half-comb 20. Bores 3 constituted of the half-bores 13 and 23, are so formed for the comb 30 constituted by both half-combs 10 and 20. Preferably, the number of bores is equal to two, these bores being then provided at the lateral ends of the comb. The comb is preferably made in thermoplastic material at least partially covered with the conductive coating.

To proceed with the fastening of the piping on the support C via the comb 30, it is advisable to fix this half-comb 10 in a temporary way while partially enclosing the pipes, then to fix the comb in a permanent way by introducing the screws 29 of the lower half-comb 20 in the half-bores 13 of the upper half-comb 10 and to tightly screw the screws 29 in the suited bores of the support C (see FIG. 1). In this FIG. 5c, the reference signs of the parts of both half-combs oppositely located were preserved: arches 11 and 21, half-bores 13 and 23, connecting faces 16 and 26, metal coating 15.

Figure 6A:
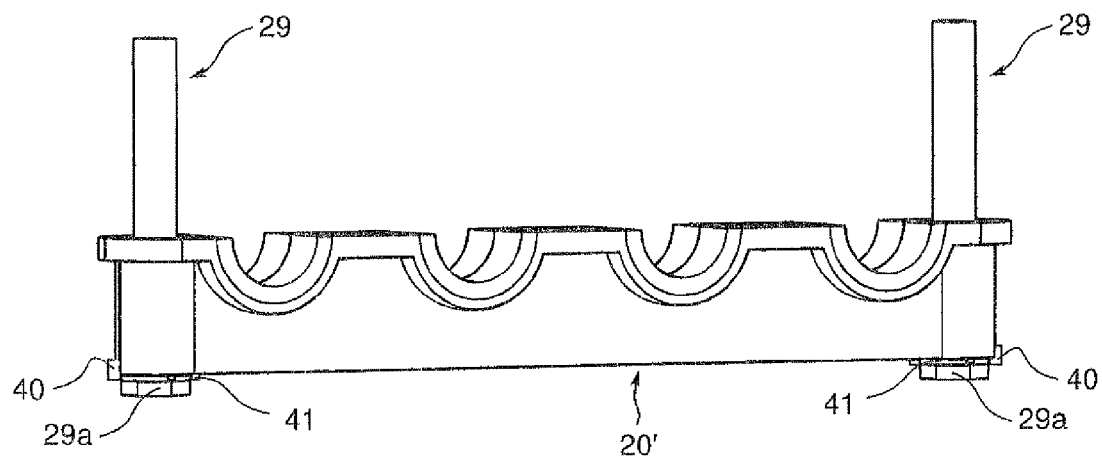
FIGS. 6a to 6c show a perspective view (FIG. 6a), a front view (FIG. 6b) and a partially cut-away view (FIG. 6c) in assembly with the upper half-comb, of an alternative embodiment of the lower half-comb with support pin.
Figure 6B:
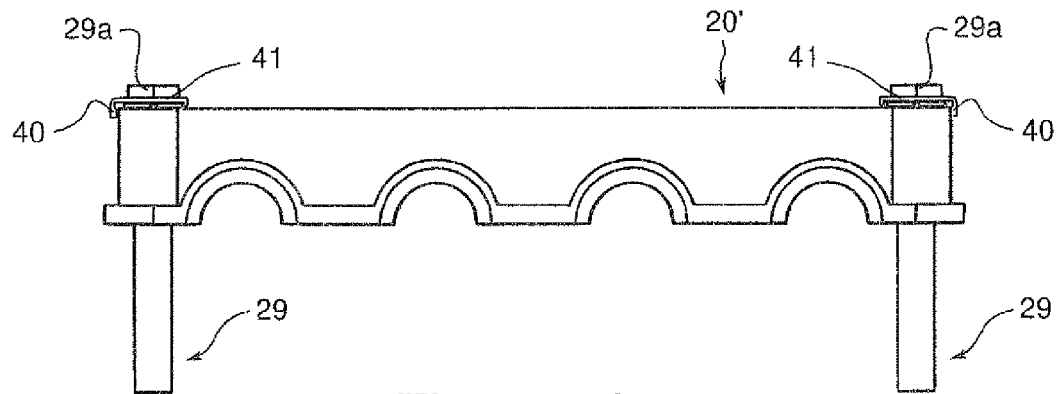

An alternative embodiment 20' of the lower half-comb is now described in reference to the perspective views and front view of FIGS. 6a and 6b. In this alternative, the retaining washer is replaced by a holding pin 40 of a captive washer 41 mounted in a smooth region of the fastening screw 29, located near the screwing head 29a.

Figure 6C:
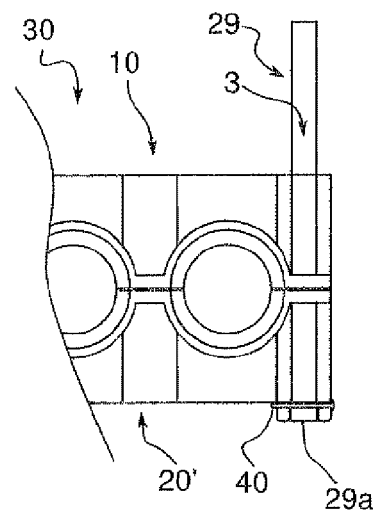

FIG. 6c shows in a partially cut-away view the assembly of the upper half-comb 10 on the fastening screw 29 of the lower half-comb 20' provided with a holding pin 40 of the captive washer 41. The other elements remain identical to the elements of the assembly according to FIG. 5c with the same reference signs. Of course, the retaining washer disappeared in this assembly.

Figure 7:
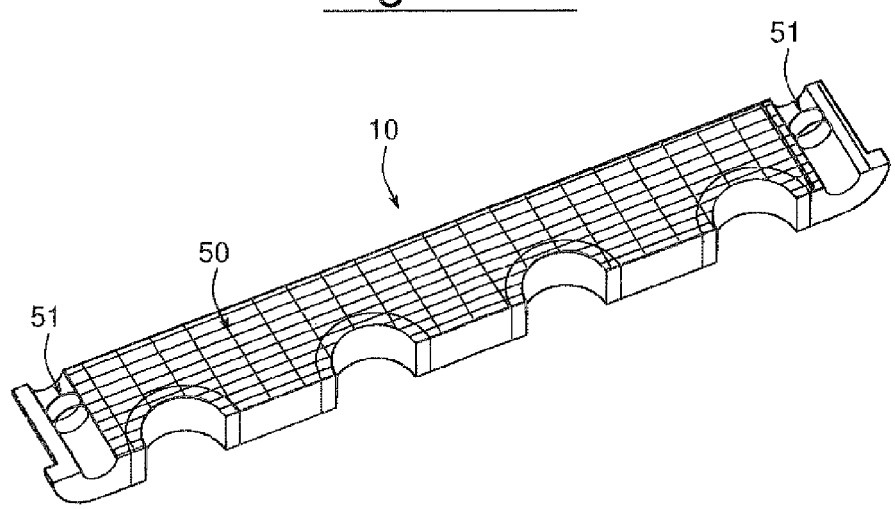
FIG. 7 shows a longitudinal cut-away view of an upper half-comb highlighting a metal mesh for reinforcement of electrical conductivity.

With reference to the longitudinal cut-away view of FIG. 7 in the median plane π (FIG. 3a of the upper half-comb 10, there is a metal mesh 50 to allow to assure higher electrical conductivity. Indeed, according to the surface to be metallized, it can be necessary to obtain a high electrical conductivity.

The metallic contact is adjusted by the permanent fastening screws 29 of the lower half-comb. A sliding ring 51, tightly mounted in each half-bore 13, can adjust this setting, if necessary, in cooperation with each rod 29c of screw 29 introduced into this half-bore.

The invention is not limited to the described and illustrated examples. For example, it is possible to provide for a deposit of the metal coating by thin film in an appropriate place. Furthermore, the sliding rings previously mentioned can be made integral with the half-bores by crimping.

The invention claimed is:

1. Multifunctional comb for securing metallic piping consisting of several parallel pipes, the comb comprising:
    an upper half-comb configured to be mounted on a support and
    a lower half-comb configured to be mounted on the support through the upper half-comb, the half-combs presenting arches facing each other configured to enclose the pipes in use, the half-combs each presenting at least two half-bores located in front of each other to form bores of the comb, as well as inter-arches connecting faces, half-bores, the arches and connecting faces being continuously covered by an electrically conductive coating characterized in that the half-bores of the upper and lower half-combs include a first fastening element integral with the half-combs and a second fastening element provided with a blocking element in the bores.

2. Multifunctional comb according to claim 1, wherein the first fastening element comprises at least one of (i) two pins projecting at the outlet of each half-bore of the upper half-comb to detachably bind to the support, (ii) a peg clip provided in each said half-bores and (iii) a clip.

3. Multifunctional comb according to claim 1, wherein the second fastening element comprises screws presenting an external head which remains outside the comb on the lower half comb side and a threaded rod long enough to cross the bores of the comb and be able to permanently settle to the support.

4. Multifunctional comb according to claim 3, wherein the screws are provided with a blocking element in the bores comprising one of a retaining washer, accommodated in the half-bore of the lower half-comb, near the inter-arches connecting face, and a holding pin of a captive washer near the screwing head.

5. Multifunctional comb according to claim 4, wherein the multifunctional comb is made in thermoplastic material covered with a conductive coating constituted by a metal layer selected among aluminum and copper alloys.

6. Multifunctional comb according to claim 5, wherein the arches are covered with a silicone layer on which the conductive coating is laid.

7. Multifunctional comb according to claim 6, wherein a metal insert is integrated into a neutral plane of the upper half-comb in order to achieve a higher electrical conductivity.

8. Assembly method for a metallic piping comprising parallel pipes successively spaced out, on a support secured in the piping environment, the method comprising:
 (a) securing only a first half-comb to the support with the aid of a first fastening element to partially enclose the pipes;
 (b) integrating a second fastening element into a second half-comb;
 (c) thereafter, while the first half-comb is secured to the support, enclosing the pipes between the first half-comb and the second half-comb so that the first and second half-combs form a full comb and provide a continuity of electrical conductivity by contact between the first and second half-combs and the pipes; and
 (d) thereafter, making the full comb integral with the support by the second fastening element that is integrated into the second half-comb by crossing the second fastening element through the first half-comb and then securing the second fastening element to the support to bring about a tight linkage of the first and second half-combs on the support as well as a continuous electrical conductivity of the assembly between the pipes and the support through the full comb.

9. Assembly method according to claim 8, wherein the first half-comb integrates an electrically conductive complement so as to increase the electrical conductivity of the assembly.

\* \* \* \* \*